Patented Mar. 24, 1953

2,632,835

UNITED STATES PATENT OFFICE 2,632,835

COATED WELDING ELECTRODE

Rene David Wasserman, Stamford, Conn.

No Drawing. Application January 24, 1952,
Serial No. 268,143

2 Claims. (Cl. 219—8)

My present invention relates to a specially coated welding electrode designed particularly for the welding of alloy steels. More specifically, it concerns such an electrode having an austenitic chromium-nickel steel core with a relatively low proportion of chromium and a special chromium-containing, electrically conductive, flux coating.

Stainless steel welding electrodes bearing a conductive flux coating are well known in the art. Such electrodes include a core of stainless steel having substantially the composition desired for the weld deposit formed thereby. In many cases it is desired to produce a weld deposit of stainless steel having a composition that includes about 29% by weight of chromium and about 9% by weight of nickel (known commercially as a 29-9 type of stainless steel). However, there are a number of disadvantages attending the use of such a core metal in the welding electrode. The principal such disadvantage is that the welds thereby produced display a very undesirable tendency to crack.

The object of my invention is to overcome such disadvantages and to produce a weld deposit having the desired high chromium content, which is not subject to cracking. I have discovered that this can be accomplished by utilizing a stainless steel of relatively low chromium content as the core metal and incorporating sufficient chromium metal in the electrode coating to produce the desired composition of high chromium content in the weld deposit. For some reason not known to me this particular means for providing the desired high chromium content in the weld deposit results in a smoother operation of the welding process and in the production of superior welds, particularly in respect of liability to cracking, heat and corrosion resistance. Despite the inclusion of chromium metal powder in the coating, my new electrodes display remarkable "non-spatter" properties.

These surprising results appear to be rather specific to a particular combination of core metal composition and coating composition, that will be described in detail hereinafter. The explanation probably resides in certain of the details, but it has not been established which are most critical. In any case, a substantial departure from the ranges of proportions hereinafter set forth will generally result in a loss of the most desirable, unpredictable effects described above.

For my novel welding electrodes I employ a core metal having a composition within the following ranges, the percentages being by weight:

| | Percent |
|---|---|
| Chromium | 17 to 20 |
| Nickel | 8 to 10 |
| Manganese | 1 to 3 |
| Silicon | Up to 3 |
| Carbon | 0.05 to 0.30 |
| Iron | Balance |

Additional metals such as molybdenum, titanium and columbium, totaling less than 1% may be tolerated, but phosphorus and sulfur should be excluded as far as possible.

The composition of the coating that I have used successfully with the aforesaid core metal lies within the following ranges, the parts being by weight:

| | |
|---|---|
| Calcium fluoride | 5 to 7.5 |
| Calcium carbonate | 7.5 to 12.5 |
| Titanium dioxide | 20 to 25 |
| Calcium silicate | 5 to 7.5 |
| Chromium metal powder | 35 to 45 |
| Ferro-silicon alloy | 5 to 10 |

These components are thoroughly mixed in powder form and converted into the desired paste form for coating the core by the addition of water and, if desired, a conventional water-dispersible binding material such as starch, alkali-metal silicate, etc. The quantity of the coating to be applied should be adjusted with reference to the amount of core metal, so that the chromium in the coating, when added to a stainless steel alloy forming the core, will bring up the chromium content of the resultant weld deposit to approximately 29% by weight.

My novel, coated welding electrodes may be used for the arc welding of high alloy steels and stainless steels generally. The customary procedures may be employed with remarkably little spattering. They readily form welds which are outstanding in their resistance to heat, corrosion and cracking.

Having described my invention generally, I shall now illustrate it by a specific example. It should be understood, however, that my invention is by no means limited to the details given in this example.

Example

A stainless steel core having a diameter of ⅛ inch and the following composition:

| | Percent by weight |
|---|---|
| Chromium | 19 |
| Nickel | 9 |
| Manganese | 2 |
| Carbon | 0.15 |
| Iron | Balance | was coated with a coating composition composed as follows:

| | Parts by weight |
|---|---|
| Calcium fluoride | 6 |
| Calcium carbonate | 10 |
| Titanium dioxide | 23 |
| Calcium silicate | 6 |
| Chromium metal powder | 40 |
| Ferro-silicon alloy | 7 |

Said coating composition was made up into the desired, heavy pastelike consistency by the addition of sufficient aqueous solution of sodium silicate, and was then applied by extruding the paste about the metal core. The thickness of the coating was adjusted, so that sufficient chromium was thereby supplied to bring the percentage of chromium in the weld deposit up to approximately 29%.

The welding electrodes so prepared were employed in the usual arc welding of stainless steel and readily produced weld deposits displaying excellent heat and corrosion resistance, and particularly resistance to cracking. There was remarkably little spatter during the welding operation.

I claim:

1. A coated welding electrode composed of a core of stainless steel having a composition within the following ranges:

| | Percent by weight |
|---|---|
| Chromium | 17 to 20 |
| Nickel | 8 to 10 |
| Manganese | 1 to 3 |
| Silicon | Up to 3 |
| Carbon | 0.05 to 0.30 |
| Iron | Balance | and a coating thereon having a composition within the following ranges:

| | Parts by weight |
|---|---|
| Calcium fluoride | 5 to 7.5 |
| Calcium carbonate | 7.5 to 12.5 |
| Titanium dioxide | 20 to 25 |
| Calcium silicate | 5 to 7.5 |
| Chromium metal powder | 35 to 45 |
| Ferro-silicon alloy | 5 to 10 |

2. A coated welding electrode composed of a core having approximately the following composition:

| | Percent by weight |
|---|---|
| Chromium | 19 |
| Nickel | 9 |
| Manganese | 2 |
| Carbon | 0.15 |
| Iron | Balance | and a coating thereon having approximately the following composition:

| | Parts by weight |
|---|---|
| Calcium fluoride | 6 |
| Calcium carbonate | 10 |
| Titanium dioxide | 23 |
| Calcium silicate | 6 |
| Chromium metal powder | 40 |
| Ferro-silicon alloy | 7 |

RENE DAVID WASSERMAN.

REFERENCES CITED

The following references are of record in the file of this patent:

UNITED STATES PATENTS

| Number | Name | Date |
|---|---|---|
| 2,024,992 | Wissler et al. | Dec. 17, 1935 |
| 2,194,712 | Miller | Mar. 26, 1940 |
| 2,408,619 | Friedlander | Oct. 1, 1946 |
| 2,408,620 | Friedlander | Oct. 1, 1946 |